No. 696,091. Patented Mar. 25, 1902.
H. H. BUTLER & W. A. DAILEY.
WASTE COCK.
(Application filed May 17, 1901. Renewed Feb. 15, 1902.)
(No Model.)
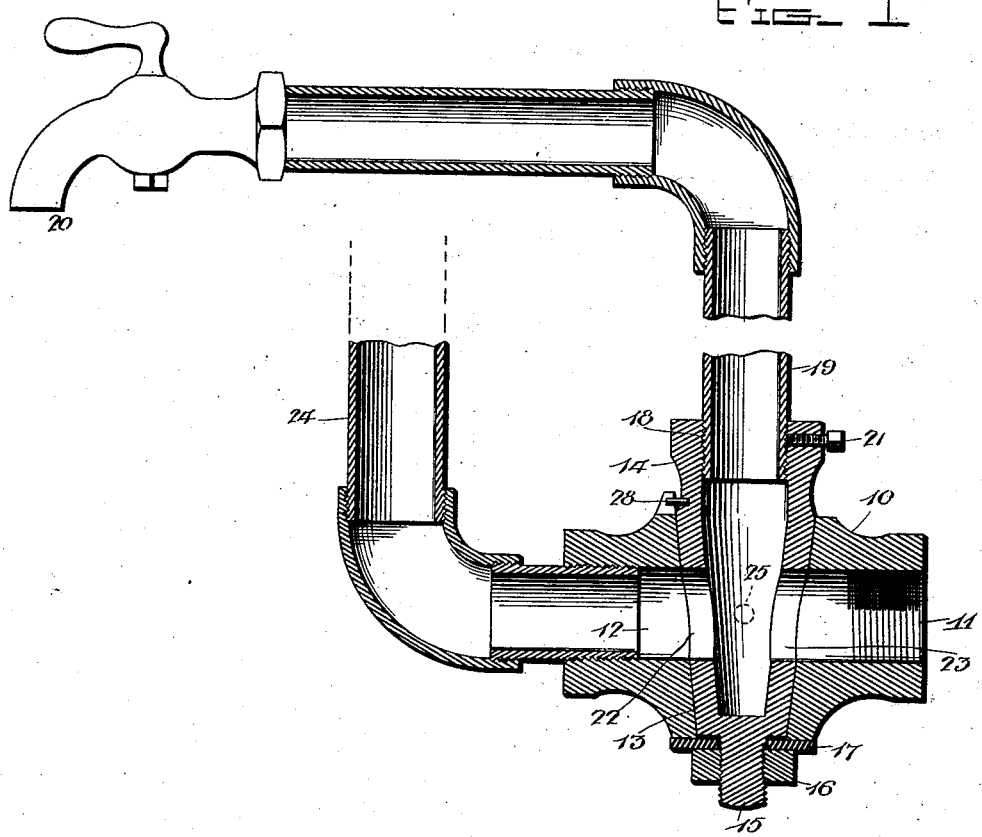
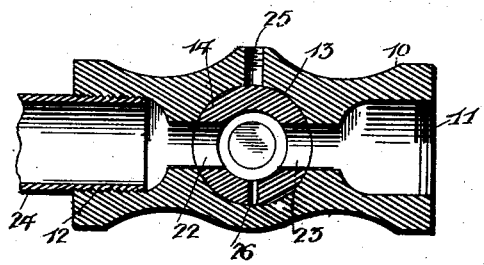
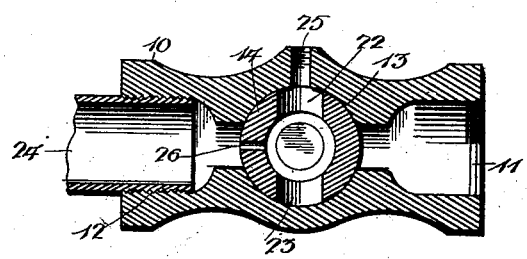
Witnesses
Inventors
Harry H. Butler
William A. Dailey
By
Attorneys
THE NORRIS PETERS CO., PHOTO-LITHO., WASHINGTON, D. C.

UNITED STATES PATENT OFFICE.

HARRY H. BUTLER AND WILLIAM A. DAILEY, OF BROCKWAYVILLE, PENNSYLVANIA.

WASTE-COCK.

SPECIFICATION forming part of Letters Patent No. 696,091, dated March 25, 1902.

Application filed May 17, 1901. Renewed February 15, 1902. Serial No. 94,325. (No model.)

*To all whom it may concern:*

Be it known that we, HARRY H. BUTLER and WILLIAM A. DAILEY, citizens of the United States, residing at Brockwayville, in the county of Jefferson, State of Pennsylvania, have invented certain new and useful Improvements in Waste-Cocks; and we do hereby declare the following to be a full, clear, and exact description of the invention, such as will enable others skilled in the art to which it appertains to make and use the same.

This invention relates to drain-cocks for use in connection with service-pipes in houses; and the object of the invention is to provide a construction wherein by rotating the service-pipe the drain-cock will be operated to cut off the water-supply from the main and at the same time to open the drain-outlet.

A further object of the invention is to provide a drain-cock to which may be connected a short section of service-pipe with a faucet attached and a longer section of drain-pipe having faucets connected therewith and located at a higher elevation and wherein the first-named drain-pipe may be rotated by rotation of its attached faucet to operate the drain-cock to drain both service-pipes and at the same time to cut off the flow from the main.

In the drawings forming a portion of this specification, and in which like numerals of reference indicate similar parts in the several views, Figure 1 is a view partly in section and partly in elevation and showing a drain-cock embodying the present invention and having two service-pipes connected therewith. Fig. 2 is a horizontal section taken through the drain-cock and centrally thereof and showing the plug in position to communicate both service-pipes with the main. Fig. 3 is a view similar to Fig. 2 and showing the plug in position to drain both service-pipes.

Referring now to the drawings, the drain-cock includes a casing 10, having a water-inlet passage 11 at one side and a water-outlet passage at a diametrically opposite point, these passages being in axial alinement and intersecting a tapered plug-seat 13, in which is engaged a hollow tapered plug 14, at the lower end of which is a threaded stem 15, having a nut 16 engaged therewith, which impinges against a washer 17, held by the nut close against the bottom of the casing to hold the plug down firmly in the seat.

The upper end of the bore of the plug 14 is threaded, as shown at 18, and engaged therewith is a service-pipe 19, which is taken upwardly and then outwardly and is provided with a faucet 20, and to hold the pipe 19 firmly, so that it will not be unscrewed from the plug 14, a set-screw 21 is engaged with a threaded perforation in the plug 14 to impinge against the threaded end of the pipe 19, that engages in the bore of the plug.

At diametrically opposite points of the plug 14 are formed ports 22 and 23, which in one position of the plug register with the passages 11 and 12, so that there may be a flow of water through the passage 11 and into the plug and thence upwardly into the pipe 19 or into the outlet-passage 12, it being understood that a second service-pipe 24 is engaged with the outlet-passage 12 and extends upwardly to points above the faucet 20. When the water from the inlet 11 is to be cut off from both pipes 19 and 24, it is only necessary to grasp the faucet 20 and move it bodily in a lateral direction, when the pipe 19 will be rotated and the plug 14 will be turned to carry the ports 22 and 23 out of registration with the passages 11 and 12.

When the plug is rotated through ninety degrees, the port 22 is brought to register with a drain-passage 25 in the casing 10 and at the same time a drain-port 26 in the plug is moved into registration with the passage 12, so that the water in both pipes 19 and 24 drains down into the plug, and thence through the port 22 and out through the passage 25.

As the pipe 19 is of less height than the pipe 24, the water from pipe 24 would back up into the pipe 19 and flow from the faucet 20 were it not for the fact that the port 26 is made much smaller than is the port 22 and the passage 25, and it is the relative sizes of these openings that prevents this backing up.

When a drain-cock is to be used without the pipe 24, the passage 12 may be plugged up or may be omitted, and to limit the rotation of the plug 14 the usual stop-pin 28 is provided. Furthermore, if desired, the surface-pipe 19 may be engaged with the minor end of the plug, which would then be inverted, and the plug may be provided with a handle for rotating it instead of being rotated by the service-pipe.

What is claimed is—

1. A drain-cock comprising a casing having a plug-seat and inlet and outlet passages opening through the walls of said plug-seat and having a drain-passage also opening through the wall of the plug-seat, and a plug rotatably disposed in the seat and adapted for attachment of a service-pipe thereto, said plug being hollow and having ports adapted to register with the inlet and outlet openings simultaneously, and one of said ports being adapted to register with the drain-passage, said plug having also a port for registration with the outlet-passage when a first-named port is in registration with the drain-passage.

2. A drain-cock comprising a casing having a plug-seat and inlet and outlet passages and a drain-passage opening into the plug-seat, and a hollow plug rotatably disposed in the plug-seat, and adapted for attachment of a service-pipe thereto said plug having ports opening thereinto and adapted to register with the inlet and outlet openings simultaneously, and to register one of them with the drain-passage when the plug is rotated to close the inlet-passage, said plug having also a port for registration with the outlet-passage when the plug is in position to close the inlet-passage, the cross-sectional area of the last-named port being less than the corresponding dimensions of either of the first-named ports and of the drain-passage.

In testimony whereof we hereunto sign our names, in the presence of two subscribing witnesses, on the 1st day of April, 1901.

HARRY H. BUTLER.
WILLIAM A. DAILEY.

Witnesses:
J. M. MILLAN,
THOMAS KEYS.